US005625397A

United States Patent [19]

Allred et al.

[11] Patent Number: 5,625,397

[45] Date of Patent: Apr. 29, 1997

[54] DOT ON DOT INK JET PRINTING USING INKS OF DIFFERING DENSITIES

[75] Inventors: Donald R. Allred, Westford; John L. Ingraham, North Chelmsford; Foster M. Fargo, Lincoln, all of Mass.

[73] Assignee: Iris Graphics, Inc., Bedford, Mass.

[21] Appl. No.: 344,114

[22] Filed: Nov. 23, 1994

[51] Int. Cl.[6] .............................. B41J 2/205; G01D 15/18

[52] U.S. Cl. .............................. 347/100; 347/15

[58] Field of Search .............................. 347/100, 15

[56] References Cited

U.S. PATENT DOCUMENTS

| | | | |
|---|---|---|---|
| Re. 27,555 | 1/1973 | Loughren | 178/5.2 |
| 1,656,338 | 1/1928 | Ranger . | |
| 1,790,723 | 2/1931 | Ranger . | |
| 1,817,098 | 8/1931 | Ranger . | |
| 3,197,558 | 7/1965 | Ernst | 178/6.6 |
| 3,404,221 | 10/1965 | Loughren | 178/5.2 |
| 3,681,650 | 8/1972 | Koll | 315/30 |
| 3,683,212 | 8/1972 | Zoltan | 310/8.3 |
| 3,739,684 | 6/1973 | Vitkevich | 85/73 |
| 3,747,120 | 7/1973 | Stemme | 346/75 |
| 3,864,696 | 2/1975 | Fischbeck | 346/140 |
| 3,961,306 | 6/1976 | Anstey | 340/155 |
| 3,977,007 | 8/1976 | Berry | 346/1 |
| 4,050,077 | 9/1977 | Yamada | 346/75 |
| 4,108,654 | 8/1978 | Goren | 96/1.2 |
| 4,178,597 | 12/1979 | Isayama | 346/75 |
| 4,272,771 | 6/1981 | Furukawa | 546/75 |
| 4,300,142 | 11/1981 | Kos | 346/76 PH |
| 4,313,684 | 2/1982 | Tazaki | 400/322 |
| 4,314,274 | 2/1982 | Atoji | 358/80 |
| 4,339,774 | 7/1982 | Temple | 358/283 |
| 4,342,051 | 7/1982 | Suzuki | 358/283 |
| 4,353,079 | 10/1982 | Kawanabe | 346/140 R |
| 4,365,275 | 12/1982 | Berman | 358/283 |
| 4,367,489 | 1/1983 | Holmes | 358/167 |
| 4,368,495 | 1/1983 | Hamanaka | 360/97 |
| 4,386,272 | 5/1983 | Check | 250/236 |
| 4,389,712 | 6/1983 | Frattarola | 365/127 |
| 4,394,662 | 7/1983 | Yoshida | 346/33 R |
| 4,394,693 | 7/1983 | Shirley | 358/298 |
| 4,403,874 | 9/1983 | Payne | 400/124 |
| 4,412,225 | 10/1983 | Yoshida | 346/1.1 |
| 4,412,226 | 10/1983 | Yoshida | 346/1.1 |
| 4,413,275 | 11/1983 | Horiuchi | 358/75 |
| 4,414,635 | 11/1983 | Gast . | |
| 4,431,319 | 2/1984 | Karaki | 400/124 |
| 4,438,453 | 3/1984 | Alston | 358/78 |
| 4,446,470 | 5/1984 | Sugiyama | 346/140 R |
| 4,468,706 | 8/1984 | Cahill | 358/300 |
| 4,488,245 | 12/1984 | Dalke | 364/526 |
| 4,492,965 | 1/1985 | Ohnishi | 346/1.1 |
| 4,494,128 | 1/1985 | Vaught | 346/140 R |
| 4,499,479 | 2/1985 | Lee | 346/140 R |
| 4,533,920 | 8/1985 | Suzuki | 346/1.1 |
| 4,533,923 | 8/1985 | Suzuki | 346/1.1 |
| 4,533,928 | 8/1985 | Sugiura | 346/140 R |
| 4,547,812 | 10/1985 | Waller | 358/283 |
| 4,549,222 | 10/1985 | Fogaroli | 358/296 |
| 4,559,542 | 12/1985 | Mita | 346/76 PH |
| 4,560,997 | 12/1985 | Sato et al. | 346/140 R |
| 4,580,150 | 4/1986 | Tazaki | 346/140 R |
| 4,595,948 | 6/1986 | Itoh | 358/75 |
| 4,604,654 | 8/1986 | Sakurada | 358/298 |
| 4,620,196 | 10/1986 | Hertz | 346/1.1 |
| 4,635,078 | 1/1987 | Sakurada et al. | 346/140 R |
| 4,672,432 | 6/1987 | Sakurada | 358/75 |
| 4,686,538 | 8/1987 | Kouzato | 346/1.1 |
| 4,695,846 | 9/1987 | Suzuki | 346/1.1 |
| 4,713,746 | 12/1987 | Watanabe | 346/1.1 |
| 4,714,964 | 12/1987 | Sasaki | 358/298 |
| 4,851,860 | 7/1989 | Mutoh | 346/75 |
| 4,855,753 | 8/1989 | Ichikawa | 346/1.1 |
| 4,860,026 | 8/1989 | Matsumoto | 346/1.1 |
| 4,952,942 | 8/1990 | Kanome | 346/1.1 |
| 4,963,882 | 10/1990 | Hickman | 346/1.1 |
| 4,967,203 | 10/1990 | Doan | 346/1.1 |
| 4,999,646 | 3/1991 | Trask | 346/11 |
| 5,091,734 | 2/1992 | Suzuki | 346/1.1 |
| 5,111,302 | 5/1992 | Chan | 358/298 |
| 5,142,374 | 8/1992 | Tajika | 358/298 |

*Primary Examiner*—Valerie A. Lund
*Attorney, Agent, or Firm*—Ladas & Parry

[57] ABSTRACT

An ink jet printer comprising a plurality of ink jets arranged for dot-on-dot continuous ink jet printing, at least two of said plurality of ink jets being supplied with ink of the same dye and different densities. A printed article and a method of printing are also disclosed.

17 Claims, 1 Drawing Sheet

DOT ON DOT INK JET PRINTING USING INKS OF DIFFERING DENSITIES

FIELD OF THE INVENTION

The present invention relates to ink jet printing and more particularly to continuous ink let printing.

BACKGROUND OF THE INVENTION

A great variety of ink jet printing technologies are known in the patent literature. Among these technologies is the use of inks of the same color but of different densities in multiple jets of an ink jet printer. The following U.S. Pat. Nos. are believed to represent the state of the art at the time that the present invention was made: 4,367,482; 4,494,128; 4,560,997; 4,604,654; 4,635,078; 4,672,432; 4,686,538; 4,695,846; 4,713,746; 4,714,964; 4,855,753; 4,860,026; 4,952,942; 4,963,882; 4,967,203; 4,999,646; 5,091,734; 5,111,302 and 5,142,374.

Dot on dot ink jet printing is known in the patent literature inter alia from U.S. Pat. Nos. 4,620,196 and 4,851,860.

SUMMARY OF THE INVENTION

The present invention seeks to provide improved image quality in continuous ink jet printing.

There is thus provided in accordance with a preferred embodiment of the present invention an ink jet printer comprising a plurality of ink jets arranged for dot-on-dot continuous ink jet printing, at least two of said plurality of ink jets being supplied with ink of the same dye and different densities.

There is additionally provided in accordance with a preferred embodiment of the present invention an ink jet printed article including printed areas wherein dots of the same dye and differing densities are printed one over the other.

In accordance with a preferred embodiment of the present invention, a dot of a relatively higher density is printed over a dot of a relatively lower density.

Further in accordance with a preferred embodiment of the present invention there is provided a method of continuous ink jet printing onto a substrate including printing multiple dots of ink of the same dye and different densities over one another.

In accordance with a preferred embodiment of the present invention the densities of the dots of ink are in complementary concentration ratios, such that the high density ink concentration is an integer multiple of the low density ink concentration. Thus each discrete color level can be expressed by an integer combination of the two inks. For example, if the high density ink has four times the dye concentration of the low density ink, then each printed pixel can have a color level in one quarter drop increments of the high density ink.

Preferably, the range of concentration ratios of the inks vary from 20:1 to 2:1 and more preferably from 6:1 to 3:1.

In accordance with one embodiment of the invention, black and white printing is provided. Alternatively in accordance with a preferred embodiment of the present invention, color printing is provided.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
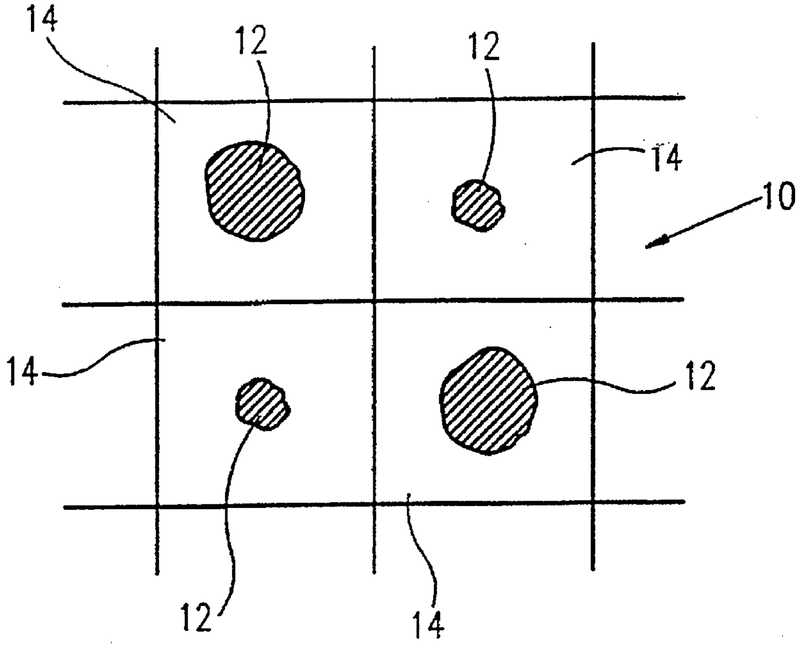
FIG. 1 PRIOR ART
FIG. 1 illustrates a portion of a prior art printed substrate employing a single density ink.

Reference is now made to FIG. 1 which illustrates a portion of a prior art printed substrate employing a single density ink. In the illustrated example, a 2×2 matrix 10 is employed and ink dots 12 of differing size of a single ink of a given density are employed in different blocks 14 of matrix 14 to provide a desired overall optical density level for the matrix. The human eye is relied upon to integrate over all four blocks 14, thereby to produce the desired optical density level.

The prior art printed substrate illustrated in FIG. 1 has the disadvantage of graininess particularly at optical density levels, such as that illustrated in FIG. 1, where large areas of some blocks 14 are left blank. It is noted that the use of multiple pixels or blocks, or pixel matrices as in FIG. 1, to express a given optical density level results necessarily in reduction of the effective spatial resolution of the resulting image formed on the printed substrate.

In accordance with a preferred embodiment of the present invention, plural inks of the same dye are employed, having differing, and preferably complementary densities. By using plural inks having different densities, in a dot on dot printing format, a desired optical density level may be much more readily achieved in each pixel and without requiring integration over multiple pixels.

Figure 2:
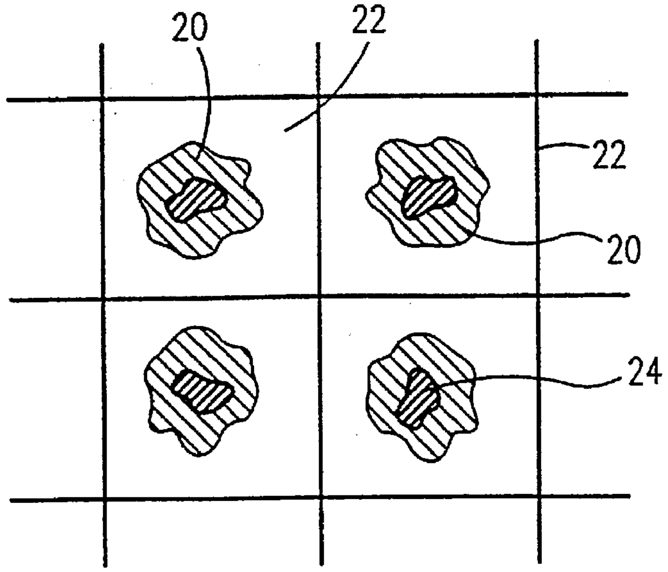
FIG. 2 illustrates a portion of printed substrate employing multiple inks of differing densities in accordance with a preferred embodiment of the present invention.

Accordingly, there is shown in FIG. 2, a portion of a printed substrate employing plural inks of the same dye having differing densities. In the embodiment of FIG. 2 the dye density of one ink is an integer fraction of the dye density of the other ink. In the illustrated embodiment of FIG. 2, the relatively lower density ink, indicated by reference numeral 20, is printed over a relatively large proportion of the area of each pixel or block 22. The relatively higher density ink, indicated by reference numeral 24 is printed over a portion of the area printed by the relatively lower density ink 22, as shown.

The embodiment of FIG. 2 has a number of advantages:

The effective spatial resolution can be a single pixel.

Variations from pixel to pixel for the same optical density are generally avoided, producing a relatively smooth image.

By using two inks having differing densities, from the same dye, the effective gray scale resolution is greatly enhanced.

It is appreciated that although the invention has been described so far with respect to monochromatic printing, it is equally applicable in multi-color printing such as color ink jet or process color printing.

The advantages of the present invention may be better appreciated from the following numerical comparative examples:

Assuming the use of a conventional continuous ink jet printer such as the IRIS 3024, commercially available from Iris Graphics, Inc., having the capability of placing up to 15 ink droplets per addressable pixel and utilizing a 2×2 pixel matrix, it can be seen that in accordance with the prior art using only a single ink for each dye, a single pixel yields only $2^4$ i.e. 16 possible gray levels and the 2×2 pixel matrix provides $2^6$ i.e. 64gray levels.

When the 2×2 matrix is used in this way, the addressable spatial resolution is reduced from a nominal 300 dpi resolution to an effective spatial resolution of 150 dpi.

In contrast to the prior art, when the present invention, as described hereinabove with reference to FIG. 2 is employed, and two inks are provided for each dye, having a ratio of relative densities of 1:5, a single pixel yields $2^4 \times 2^4 = 2^8 = 256$ gray levels. The use of the 2×2 matrix is obviated and thus the full 300 dpi nominal spatial resolution remains effective.

It will be appreciated by persons skilled in the art that the present invention is not limited by what has been particularly shown and described hereinabove. Rather the scope of the present invention is defined only by the claims which follow.

We claim:

1. An ink jet printer comprising:

a plurality of ink jets arranged for dot-on-dot continuous ink jet printing; and an ink supply assembly associated with said plurality of ink jets and being operative to supply at least two of said plurality of ink jets with inks of the same dye and different dye concentrations, said at least two of said plurality of ink jets being operative to produce multi-pixel ink dots including at least one pixel at which ink having a relatively higher dye concentration is printed over only part of a region printed with ink having a relatively lower dye concentration.

2. An ink jet printer according to claim 1 and wherein the relatively higher density dye concentration is an integer multiple of the relatively lower density dye concentration.

3. An ink jet printer according to claim 2 and wherein the inks have concentration ratios in a range extending between 20:1 and 2:1.

4. An ink jet printer according to claim 2 and wherein the inks have dye concentration ratios in a range extending between 6:1 and 3:1.

5. An ink jet printer according to claim 1 and providing black and white printing.

6. An ink jet printer according to claim 1 and providing color printing.

7. An ink jet printed article including sub-dot pixel printed areas wherein inks of the same dye and differing dye concentrations are printed one over the other, and at which ink having a relatively higher dye concentration is printed over only part of a region printed with ink having a relatively lower dye concentration.

8. An ink jet printed article according to claim 7 and wherein the relatively higher density dye concentration is an integer multiple of the relatively lower density dye concentration.

9. An ink jet printed article according to claim 7 and wherein the inks have dye concentration ratios in a range extending between 20:1 and 2:1.

10. An ink jet printed article according to claim 7 and wherein the inks have dye concentration ratios in a range extending between 6:1 and 3:1.

11. An ink jet printed article according to claim 7 and providing black and white printing.

12. An ink jet printed article according to claim 7 and providing color printing.

13. A method of continuous ink jet printing onto a substrate including:

providing an ink jet printer comprising a plurality of ink jets arranged for dot-on-dot continuous ink jet printing;

providing at least two inks from the same dye and having different dye concentrations to at least two of said plurality of ink jets; and printing multi-pixel ink dots including at least one pixel at which ink having a relatively higher dye concentration is printed over only part of a region printed with ink having a relatively lower dye concentration.

14. A method according to claim 13 and wherein the inks have dye concentration ratios in a range extending between 20:1 and 2:1.

15. A method according to claim 13 and wherein the inks have dye concentration ratios in a range extending between 6:1 and 3:1.

16. A method according to claim 13 and providing black and white printing.

17. A method according to claim 13 and providing color printing.

* * * * *